United States Patent [19]

Reynard

[11] Patent Number: 5,676,271
[45] Date of Patent: Oct. 14, 1997

[54] CLAMP-ON CONTAINER MODULE

[76] Inventor: Kenneth Reynard, 13D Croftsheads, Sowerby, Thirsk YO7 RSK, Great Britain

[21] Appl. No.: 545,741
[22] PCT Filed: Apr. 12, 1994
[86] PCT No.: PCT/GB94/00770
  § 371 Date: Feb. 23, 1996
  § 102(e) Date: Feb. 23, 1996
[87] PCT Pub. No.: WO94/24023
  PCT Pub. Date: Oct. 27, 1994

[30] Foreign Application Priority Data

Apr. 13, 1993 [GB] United Kingdom .............. 9307510

[51] Int. Cl.⁶ ......................................... B65J 1/22
[52] U.S. Cl. ............................... 220/1.5; 24/287
[58] Field of Search ...................... 220/1.5; 24/287; 296/35.1; 410/69, 70, 83

[56] References Cited

U.S. PATENT DOCUMENTS

| | | | |
|---|---|---|---|
| 3,781,139 | 12/1973 | Lohse | 417/313 |
| 3,872,555 | 3/1975 | Link et al. | 24/221 R |
| 4,212,251 | 7/1980 | DiMartino | 220/1.5 X |
| 4,352,613 | 10/1982 | Bertolini | 220/1.5 X |
| 4,626,155 | 12/1986 | Hlinsky et al. | 220/1.5 X |
| 4,741,449 | 5/1988 | Bersani | 220/1.5 |
| 5,002,418 | 3/1991 | McCown et al. | 24/287 X |

FOREIGN PATENT DOCUMENTS

WO 87/04994  8/1987  WIPO ............... B65D 88/12

Primary Examiner—Steven M. Pollard
Attorney, Agent, or Firm—Madson & Metcalf, P.C.

[57] ABSTRACT

A clamp-on container module (12) which is adapted to be mounted in one end of an I.S.O. container (10) having upper and lower corner lift fittings (11), said module having clamps (13) which are engageable with at least the upper corner lift fittings of the container, in which each said clamp comprises: a mounting bracket (20) securable to said module (12); a shank (23) mounted in said bracket for relative axial movement between a clamping position and a release position; a clamping head (24) mounted on one end of said shank (23) and adapted to cooperate with a respective corner fitting (11), said head being angularly adjustable about the axis of the shank between an entry position in which the head can enter the respective corner fitting, and a captive position in which the head is prevented from withdrawal from the fitting; an actuator lever (25) operable to rotate the head (24) between the entry position and the captive position; and, a lever-operated ratchet mechanism (26) operable to move the shank (23) axially to the clamping position, after the head (24) has been rotated to the captive position, in order to clamp the head to the corner fitting, and thereby to clamp an adjacent part of the module to the container end.

8 Claims, 6 Drawing Sheets

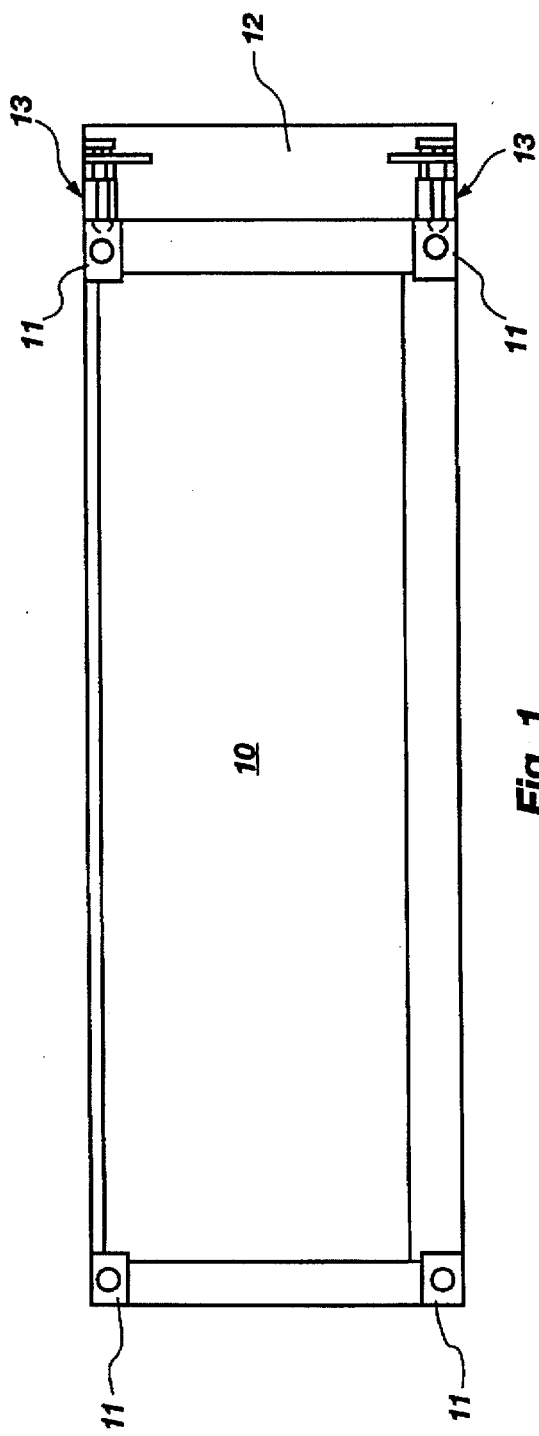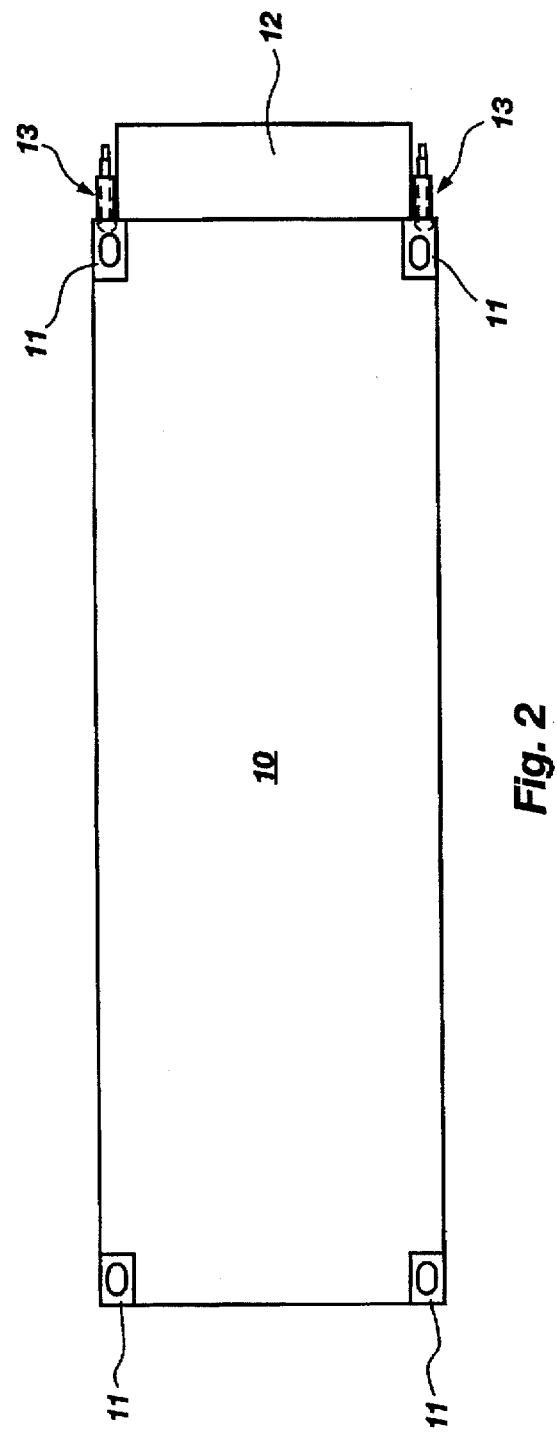

CLAMP-ON CONTAINER MODULE

This invention relates to a clamp-on container module which is adapted for mounting on one end of an I.S.O. container, such module being intended to incorporate an auxiliary power source for operating energy-consuming facilities provided in the container.

The invention has been developed primarily, though not exclusively, in connection with a container module which is capable of providing energy input to operate a container refrigeration system while the container is in transit.

It has been known for many years to attach auxiliary generator modules to I.S.O. shipping containers to provide a power source to power a container refrigeration system, and such modules have traditionally been mounted on the front end wall of the container via over-centre type clamps. I.S.O. containers are usually provided with corner fittings at each of the eight corners of the container, and which have standard apertures through which standardised container lifter devices can be entered for the purposes of transferring the container from one place to another e.g. from a vehicle trailer or railway truck to the deck of a ship, or vice versa.

The over-centre clamps which have been used in the past are capable of making clamping engagement with the corner fittings, and such clamps are rigidly secured to the module which is to be clamped to the container.

These known clamps have clamping heads which can be rotated between an entry position (in which the head can be received through a side entry aperture of the fitting), and a captive position in which the head engages with the fitting so as to resist withdrawal of the head from the fitting. After rotation to the captive position, a manually operated lever is manipulated in order to clamp the head firmly to the fitting, and at the same time to clamp the module (to which a number of clamps are secured) to the container.

The lever which operates the clamp is an over-centre type lever which has the disadvantage of: (1) requiring considerable force to clamp the head to the fitting, and at the same time to draw the module tightly up against the container end; (2) cannot readily be remotely operated (as the levers form an integral part of the clamps), and therefore usually require an operator to position himself near to the corner fitting concerned, which in the case of the top corner fittings (which are normally about 2.5 meters above ground level) means the operator has to climb a ladder to reach the fittings or else (as is often the case) the operator climbs onto the usual fork lift arms of a fork lift used to present the module to the container end; and (3) the range of clamping movement is relatively small, and therefore very accurate placement of the module is required before clamping can take place.

Therefore, all of these factors contribute to an unsatisfactory mode of clamping operation (and unclamping), as well as involving risk of personal injury, which regrettably has resulted in many on-site accidents.

The present invention therefore seeks to provide an improved form of module clamping system, which is easy to operate and which preferably lends itself to remote operation when required e.g. from ground level to improve safety.

According to the invention there is provided a clamp-on container module which is adapted to be mounted on one end of an I.S.O. container having upper and lower corner lift fittings, said module having clamps which are engageable with at least the upper corner lift fittings of the container, and in which each said clamp comprises:

a mounting bracket securable to said module;

a shank mounted in said bracket for relative axial movement between a clamping position and a release position;

a clamping head mounted on one end of said shank and adapted to cooperate with a respective corner fitting, said head being angularly adjustable about the axis of the shank between an entry position in which the head can enter the respective corner fitting, and a captive position in which the head is prevented from withdrawal from the fitting;

an actuator lever operable to rotate the head between the entry position and the captive position; and, a lever-operated ratchet mechanism operable to move the shank axially to the clamping position, after the head has been rotated to the captive position, in order to clamp the head to the corner fitting, and thereby to clamp an adjacent part of the module to the container end.

The actuator lever can be easily operated in order to rotate the head between the entry position and the captive position, and the ratchet mechanism also can be easily operated in order to complete the clamping operation and to draw the clamping head into tight clamping engagement with the respective corner fitting, and thereby also clamp the module tightly against the container end.

The clamp-on module may be attached to the container end via respective clamps engaging with the upper corner lift fittings only, but if a full-height clamp-on module is provided, then respective clamps may be provided to clamp the module to the container end by engagement with both the top and the bottom pairs of corner lift fittings.

Preferably, the ratchet mechanism is lever operated, having a lever projecting generally radially of the shank, and this arrangement lends itself easily to remove operation, in that an operator at ground level may readily operate the lever by use of an extension tube or the like to fit over the end of the lever.

Similarly, the actuator lever, which controls the angular adjustment of the clamping head about the axis of the shank, may be operated in the same way if required.

The ratchet mechanism preferably includes a ratchet wheel coupled with the shank, to rotate the latter when the wheel is rotated intermittently via a lever-operated pawl.

The shank may have an extended threaded portion taken through the bracket and coupled with the ratchet mechanism, whereby uni-directional rotation of the ratchet causes required axial movement of the shank.

The clamp preferably includes a holder with which the actuator lever is engageable, after rotation of the head to the captive position, so that the head is retained in the captive position during the axial clamping movement of the shank.

The holder may have a slot extending parallel to the path of movement of the shank, so that the head remains in its angularly adjusted captive position as it is tightened to the clamping position.

The holder may be arranged within the confines of the bracket, or may be spaced therefrom along the axis of movement of the shank.

Desirably, the ratchet mechanism is operated to carry out the final stages of a clamping operation, when a final and fine tightening adjustment can easily be carried out in view of the high mechanical advantage of the arrangement, whereas initial and more rapid coarse adjustment of the head to the clamping position may be obtained by providing a manually operated knob on an opposite end of the shank, and which can be rotated in order to carry out the initial axial movement of the shank until the head just comes into clamping engagement with its respective corner fitting.

Preferred embodiments of clamp-on container module according to the invention will now be described in detail, by way of example only, with reference to the accompanying drawings, in which:

FIG. 1 is a schematic side view of an I.S.O. container having a clamp-on module according to the invention clamped to one end thereof;

FIG. 2 is a plan view according to FIG. 1;

Figure 3:
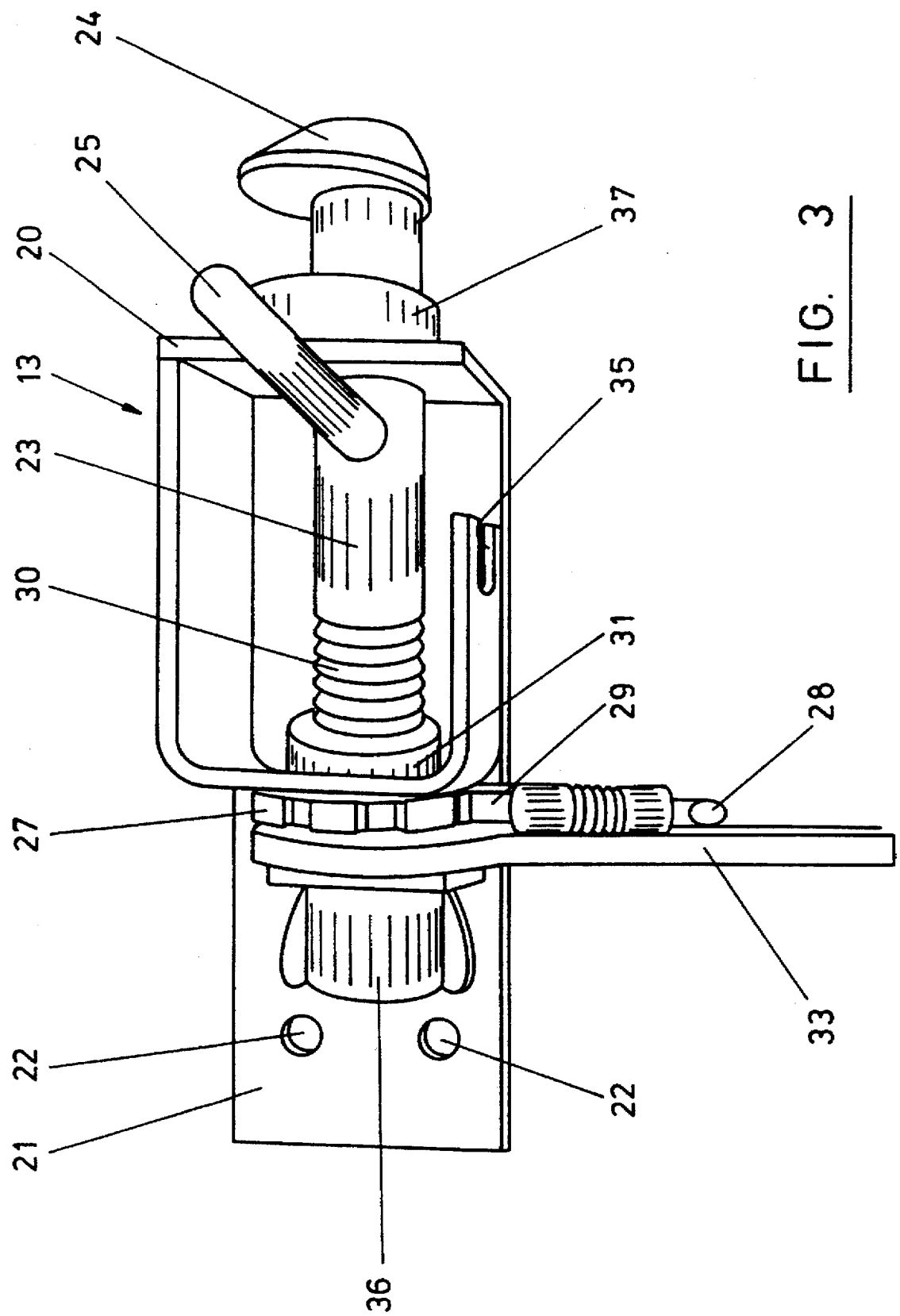
FIG. 3 is a perspective illustration of a first embodiment of a series of clamps for coupling the module rigidly to the corner fittings of the container, and illustrating the clamp in a release and unclamped position.

Referring first to FIGS. 1 and 2 of the drawings, this shows schematically a standard I.S.O. container designated generally by reference 10, and having a series of standard corner lift fittings 11 at each corner of the container i.e. two upper pairs of lift fittings and two lower pairs of lift fittings at each end of the container.

A preferred embodiment of clamp-on module 12 is illustrated, which is clamped to one end of the container 10 via a series of clamping devices, and each of which is capable of making clamping engagement with a respective corner lift fitting 11, by entry of a clamping head of each clamping device through a normal side entry aperture.

Module 12 is assumed to be an auxiliary refrigeration unit, which incorporates a suitable power pack e.g. a diesel operated generator, and which is able to supply power to drive a refrigeration system provided within container 10. These types of refrigeration systems, and power input from clamp-on modules are well known per se, and need not be described in detail herein.

FIGS. 1 and 2 show in schematic form only clamping devices designated generally by reference 13, and which are capable of clamping themselves rigidly to the respective corner fittings 11, and thereby also to draw the module 12 into tight engagement with the end of the container at the same time.

Reference will now be made to the first embodiment of clamping device which is shown in more detail in FIGS. 3 to 5 of the drawings. The clamping device comprises a mounting bracket 20 secured to a mounting plate 21 which can be tightly clamped to a suitable mounting point on module 12 e.g. by means of bolts or other fittings taken through apertures 22 in mounting plate 21.

Figure 4:
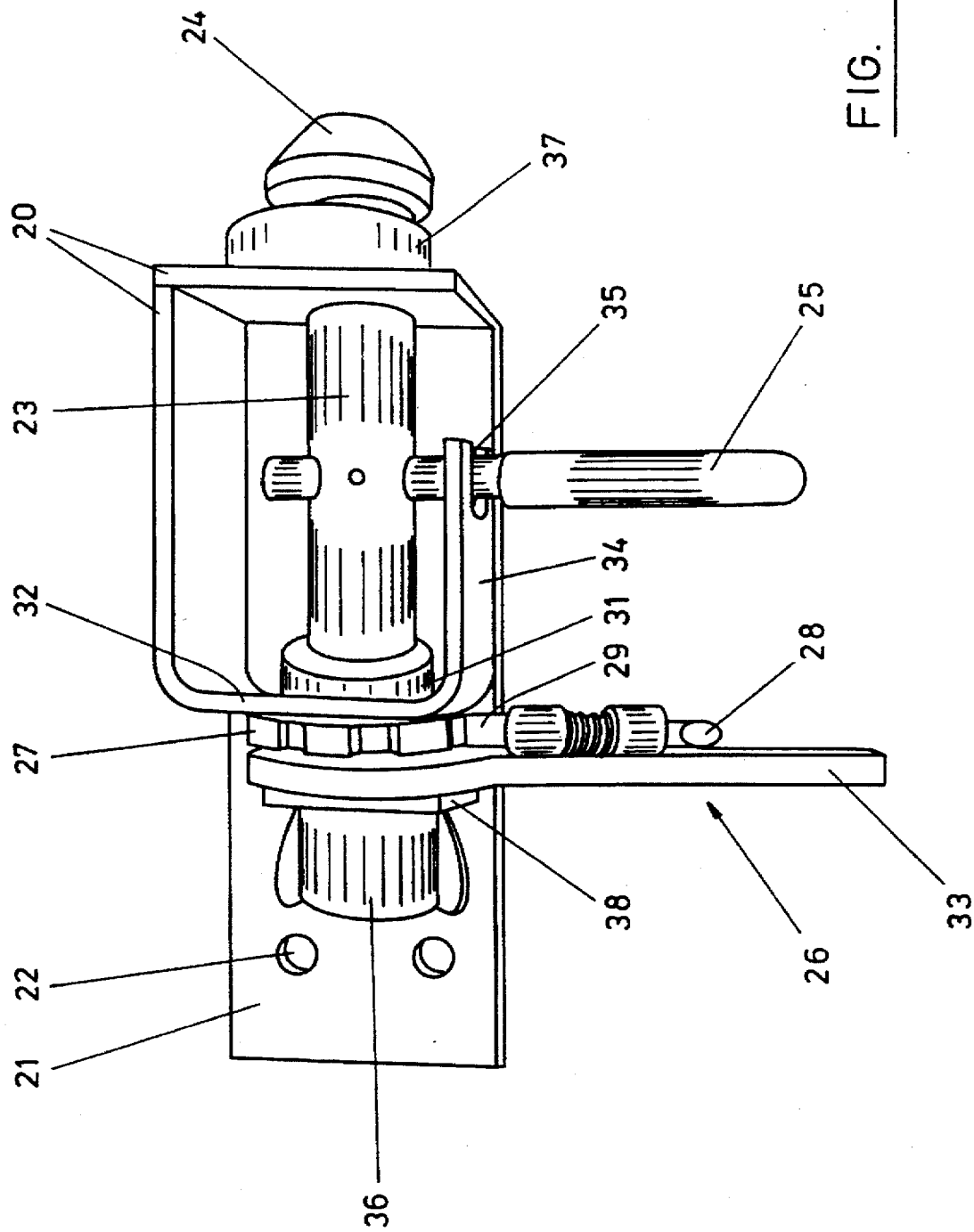
FIG. 4 is a view, similar to FIG. 3, but showing the clamp in a position which it takes-up when a clamping head has been rotated to a captive position within a respective corner fitting (not shown), and drawn into tightly clamped engagement therewith.
Figure 5:
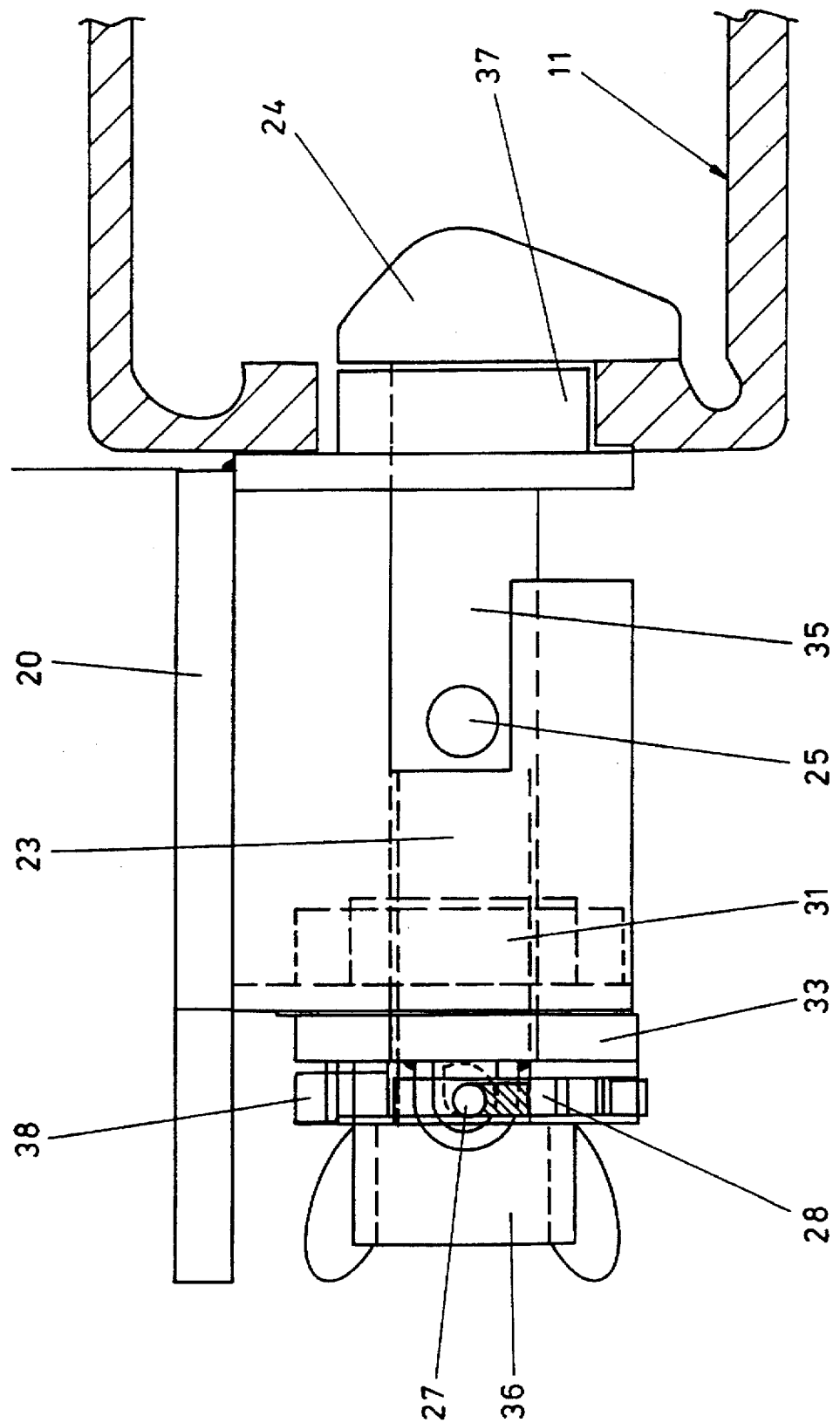
FIG. 5 is a detail illustration of the clamp of FIGS. 3 and 4 in a tightly engaged and clamped position with respect to one of the standard corner lift fittings of the I.S.O. container shown in FIGS. 1 and 2.

A shank 23 is mounted in the bracket 20 for relative axial movement between a release position, as shown in FIG. 3, and a clamping position as shown in FIG. 4, or FIG. 5. A T or L shaped clamping head 24 is mounted on one end of the shank 23, and is adapted to cooperate with a respective corner fitting 11, as shown in the fully engaged and clamped position of FIG. 5, which includes a section taken through a standard corner fitting. The clamping head 24 is angularly adjustable about the axis of the shank 23 between an entry position, as shown in FIG. 3, in which the head 24 can enter the respective corner fitting via a usual side entry aperture, and an engaging or captive position in which the head is prevented from withdrawal from the fitting.

An actuator lever 25 is operable to rotate the head 24 between the entry position and the captive position, and in the illustrated arrangement comprises a short handle rigidly secured to, and projecting radially from shank 23. Lever 25 can easily be manipulated manually in order to rotate the clamping head 24 between the entry position and the engaging position. If remote operation is required, which may be desirable in the case of clamping the upper clamping devices to the top corner fittings, an extension tube or other device may be attached to lever 25 so that an operator, standing on the ground, can carry out this initial adjustment of the clamping head.

The clamping device also includes a lever-operated ratchet mechanism, which preferably also can be remotely operated by an extension tube or the like, and which is operable to move the shank 23 axially to the clamping position, after the head 24 has been rotated to the captive position, in order to clamp the head 24 tightly to the corner fitting 11, and thereby at the same time to clamp the adjacent part of the module 12 to the end of the container.

The ratchet mechanism is designated generally by reference 26 and comprises a ratchet wheel 27, which is coupled with shank 23 in such a way that, upon rotation of the wheel 27 by ratchet lever 28 and pawl 29, it drives the shank 23 in one direction only i.e. from right to left in FIG. 3, to move the clamping head 24 (after turning to the captive position) to a clamped position by increments, following repeated oscillation of ratchet lever 28 which engages the outer periphery of ratchet wheel 27 via sliding pawl 29.

Shank 23 has an externally threaded portion 30 which passes through locking collar 31 located adjacent to an end plate 32 of bracket 20. Ratchet lever 28 is coupled with an operating handle 33, and evidently angular reciprocation of handle 33 will apply unidirectional incremental advance of ratchet wheel 27, and via its coupling with shank 23, will effect axial displacement of shank 23 in the clamping direction. If remote operation of the ratchet mechanism is required, a tube or other extension piece may be coupled with operating handle 33, to enable an operator to complete the clamping operation from ground level.

The clamp 13 includes a holder 34 having an axially extending slot 35 which extends parallel to the axial direction of movement of shank 23, and upon pivoting of lever 25 to the captive position of clamp head 24, handle 25 is now in line with slot 35, and axial movement of the shank 23 moves the handle 25 into engagement with the slot 35 of holder 34, and which therefore retains the clamping head 24 in the captive position, whereby it cannot be withdrawn from the corner fitting 11.

The ratchet mechanism 26 is preferably used for the final and "fine" adjustment of the clamp to the fully clamped position, and the high mechanical advantage provided by the mechanism enables this to be achieved easily and without major effort.

Evidently, as can be seen from FIG. 3, the head 24 projects a substantial distance from bracket 20 when in the release position, and preferably the major part of the axial movement of the clamping head and shank to the clamping position is achieved by operation of a coarse adjustment mechanism, which comprises a manually operable knob 36 mounted on an opposite end of shank 23. Operation of knob 36 enables rapid take-up of clearance within the corner fitting 11 until the clamping head 24 just comes into engagement with an end of the fitting, as can be seen from FIG. 5. Thereafter, final clamping takes place by operation of the ratchet mechanism 26, and this clamps the device 13 firmly to the corner fitting 11, and at the same time clamps the adjacent part of the module to the container.

The device 13 also includes a face block 37, through which the shank 23 extends, and located on a facing end of bracket 20, and which has an oval shape and a depth such that it can readily engage in a standard side entry aperture of an I.S.O. corner fitting, as can be seen in FIG. 5, and without projecting into the interior of the fitting.

At the opposite end of the shank 23, a bearing plate 38 is provided, against which knob 36 can engage. In order to release the clamp, knob 36 can be rotated in a release direction, thereby allowing shank 23 to be displaced axially to the right, preferably by manipulation of handle lever 25, and followed by pivoting of the handle lever 25 to move the clamping head 24 to the release position shown in FIG. 3, whereby the coupling device can be withdrawn from the corner fitting 11.

Locking collar 31 can be manipulated to permit release of the clamp, and also adjustment of the clamp to the clamping position, after which it can return to the position shown in FIG. 4 or 5 to lock the assembly.

The design of the clamping device shown in FIGS. 3 to 5 is such as to permit substantial axial travel of the shank 23, to permit the installation of the device in difficult conditions.

A clamp-on module, e.g. a power generator/refrigeration unit, can therefore be readily attached to an I.S.O. container, even on rough terrain, and with a greatly improved clamping range, and further can be remotely operated e.g. from ground level with a simple extension handle or a piece of suitable diameter pipe.

Figure 6:
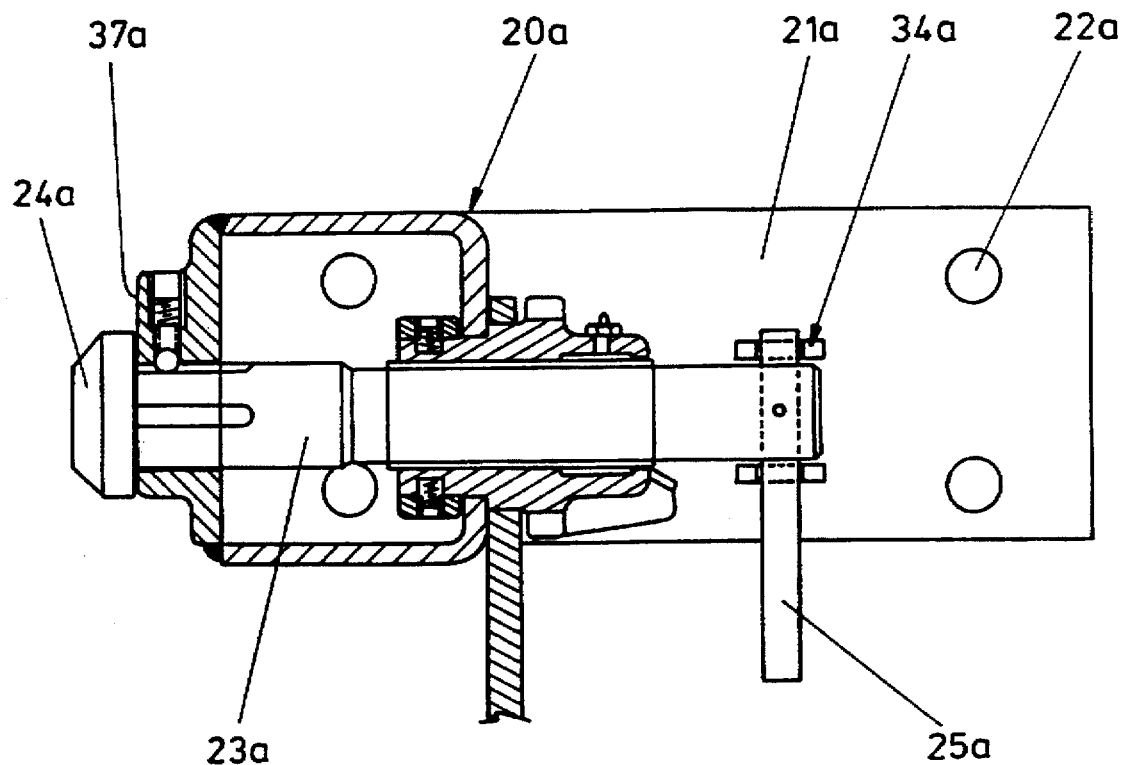
FIG. 6 is a side view, partly in section, of a second embodiment of clamping device for coupling the clamp-on module to the I.S.O. container, and showing the clamping head in the engaged and clamping position.
Figure 7:
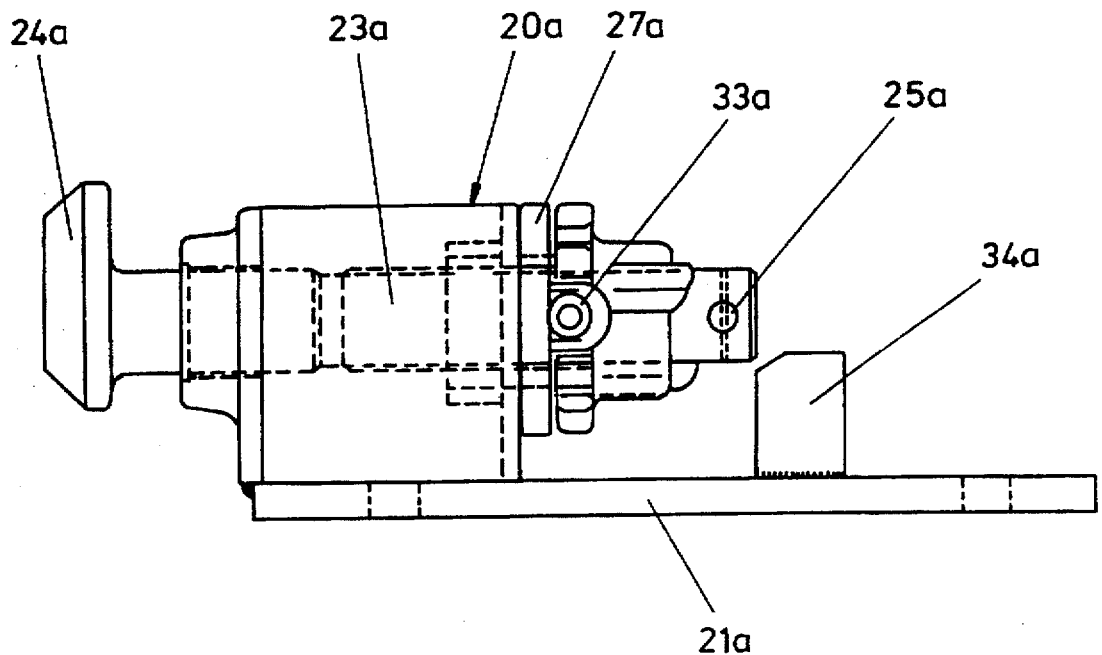
FIG. 7 shows the second embodiment of clamping device, but in an unclamped and release position; and, FIG. 8 is an end view of the second embodiment of clamping device.
Figure 8:
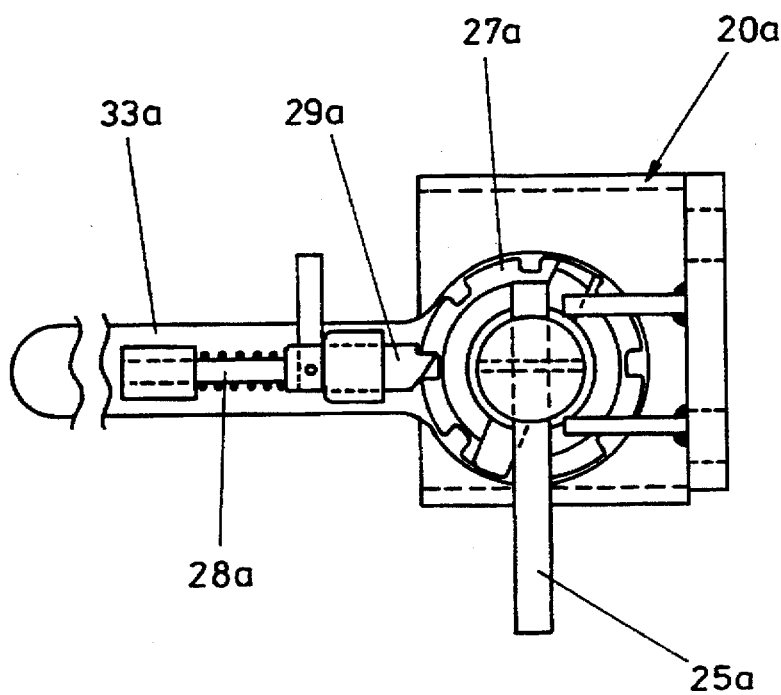

The embodiment of FIGS. 3 to 5 has holder 34 provided within the confines of the bracket 20, but an alternative arrangement may be provided, as shown in FIGS. 6 to 8, in which a holder 34a is arranged externally of the bracket 20a, but axially spaced along the path of movement of the axially reciprocatable shank 23a. Parts corresponding with those already described are given the same reference numerals, but with the addition of the letter a.

I claim:

1. A clamp-on container module which is adapted to be mounted on one end of an I.S.O. container having upper and lower corner lift fittings, said module having clamps which are engageable with at least the upper corner lift fittings of the container, in which each said clamp comprises:

a mounting bracket securable to said module;

a shank mounted in said bracket for relative axial movement between a clamping position and a release position;

a clamping head mounted on one end of said shank and adapted to cooperate with a respective corner fitting, said head being angularly adjustable about the axis of the shank between an entry position in which the head can enter the respective corner fitting, and a captive position in which the head is prevented from withdrawal from the fitting;

an actuator lever operable to rotate the head between the entry position and the captive position;

a lever-operated ratchet mechanism operable to move the shank axially to the clamping position, after the head has been rotated to the captive position, in order to clamp the head to the corner fitting, and thereby to clamp an adjacent part of the module to the container end; and an operating knob coupled with the shank and operative to effect coarse adjustment of the axial movement of the shank to move the clamping head towards the clamping position, and in which final and fine adjustment to the fully clamped position can then be taken over by operation of said ratchet mechanism.

2. A clamp-on container module according to claim 1, in which the ratchet mechanism is lever-operated, having a lever projecting generally radially of said shank.

3. A. A clamp-on container module according to claim 1, in which said actuator lever is mounted on said shank, and projects outwardly therefrom, said actuator lever being operative to rotate the shank about its axis, in order to adjust the clamping head between the entry position and the captive position.

4. A clamp-on container module according to claim 1, in which the ratchet mechanism includes a ratchet wheel coupled with said shank to move the latter axially, when the ratchet wheel is rotated intermittently via a lever-operated pawl.

5. A clamp-on container module according to claim 4 in which the shank has an externally threaded portion coupled with said ratchet mechanism.

6. A clamp-on container module according to claim 1, including a holder engageable with said actuator lever, after rotation of the clamping head to the captive position upon actuation of the lever, so that the head is retained in the captive position.

7. A clamp-on container module according to claim 6, in which said holder has a slot extending parallel to the path of movement of the shank so that the head remains in its angularly adjusted captive position as the shank moves axially in order to move the clamping head to the clamping position.

8. A clamp-on container module according to claim 6, in which the holder is arranged within the confines of the mounting bracket or is spaced therefrom along the axis of movement of the shank.

* * * * *